Figure 6:
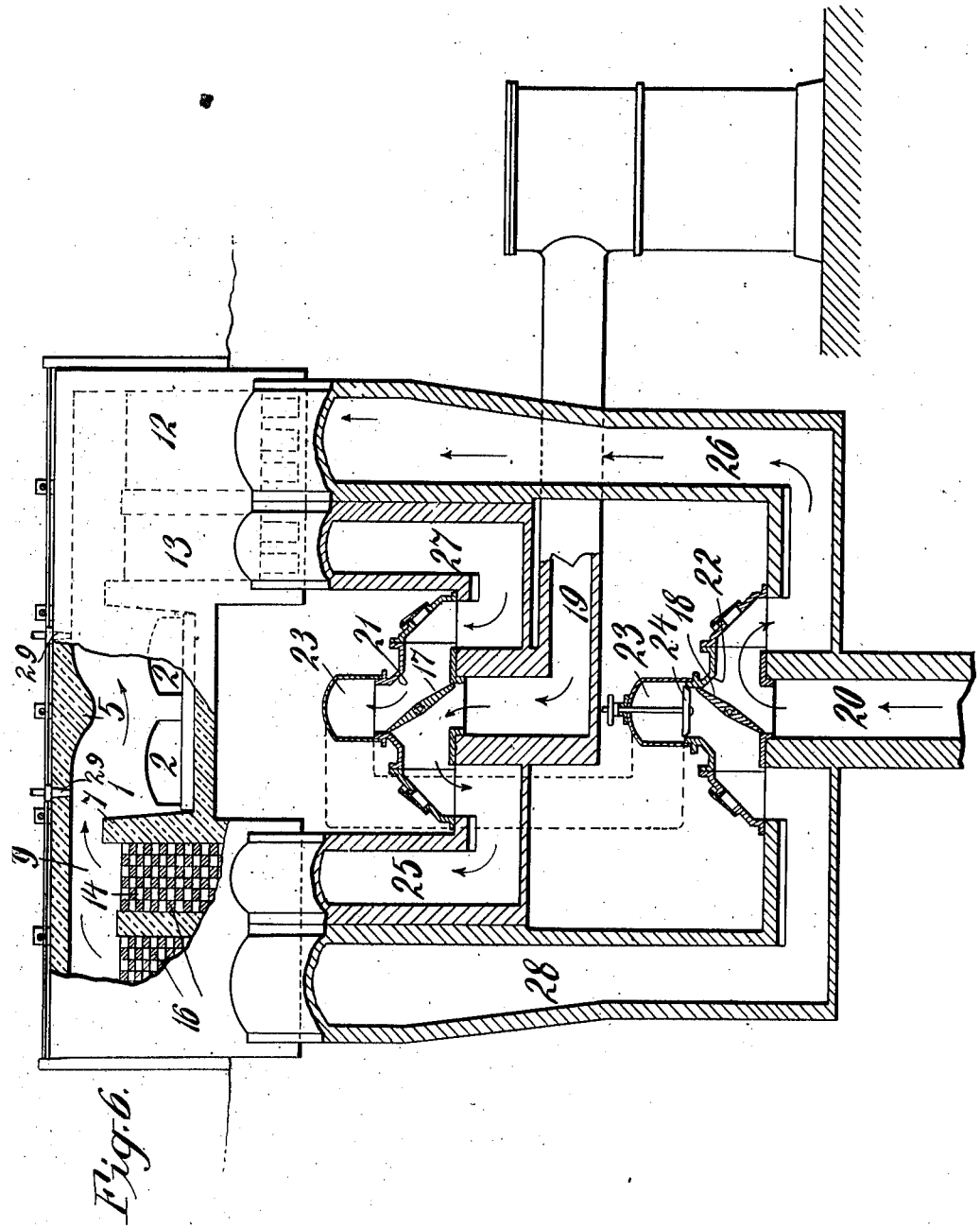

B. E. ELDRED.
METALLURGICAL HEATING PROCESS.
APPLICATION FILED MAY 28, 1907.
1,035,331.
Patented Aug. 13, 1912.
4 SHEETS—SHEET 1.
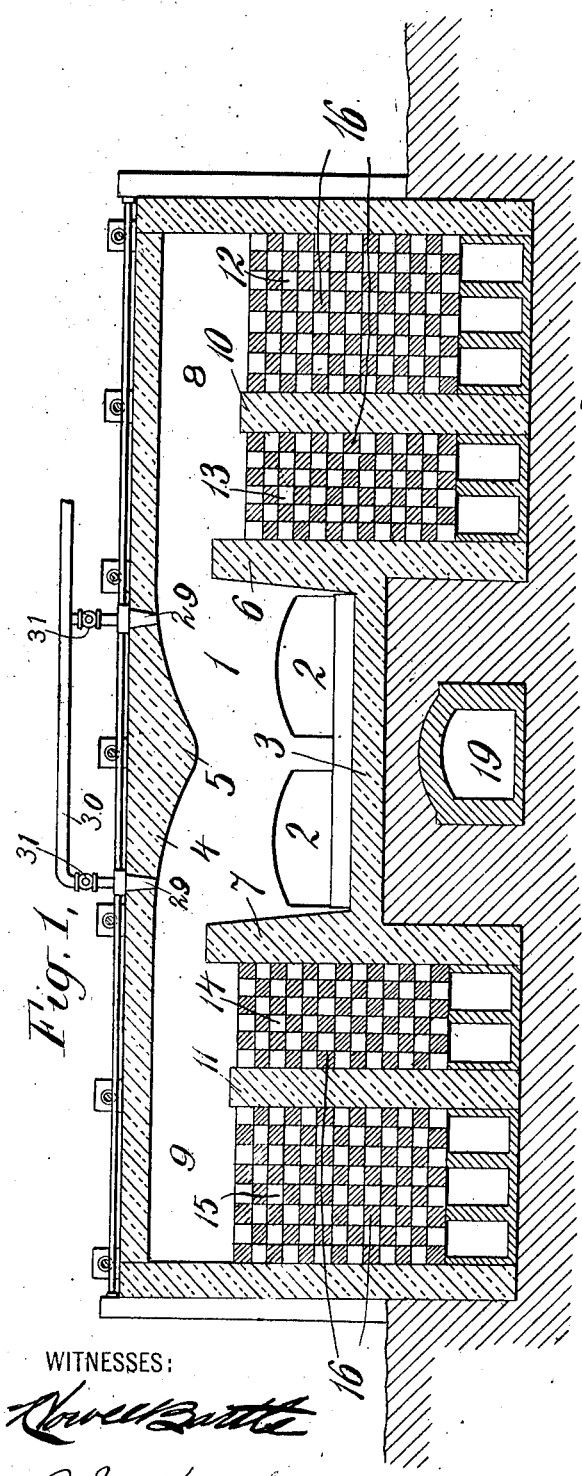
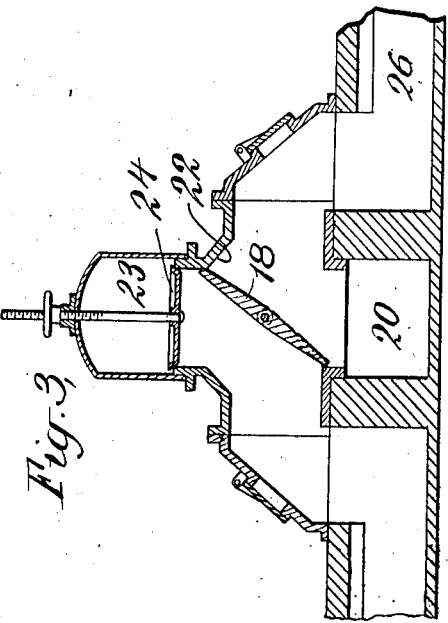
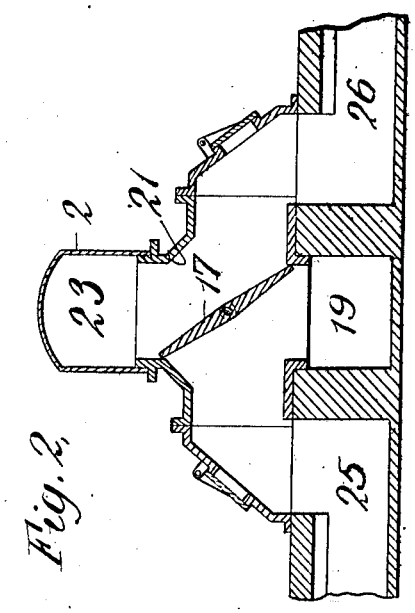
WITNESSES:
INVENTOR
Byron E. Eldred
BY
Marble & McElroy
ATTORNEY

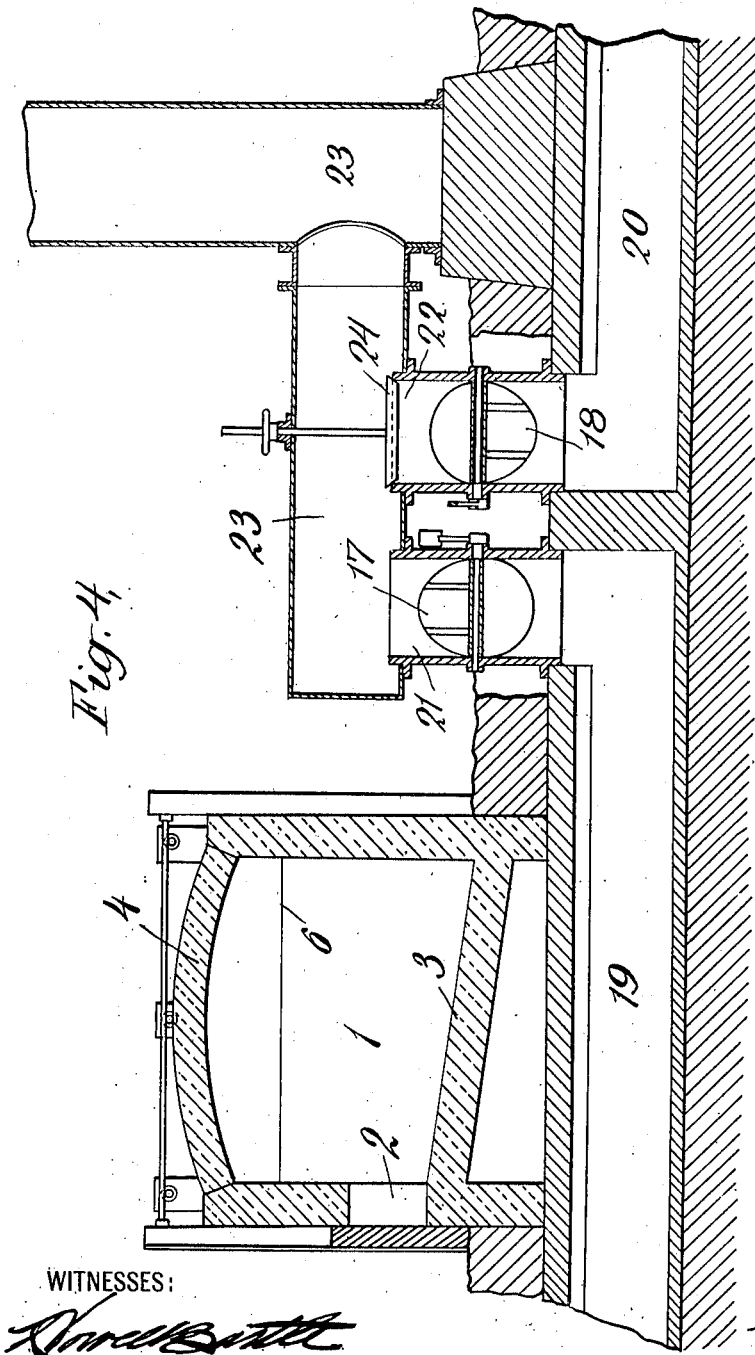

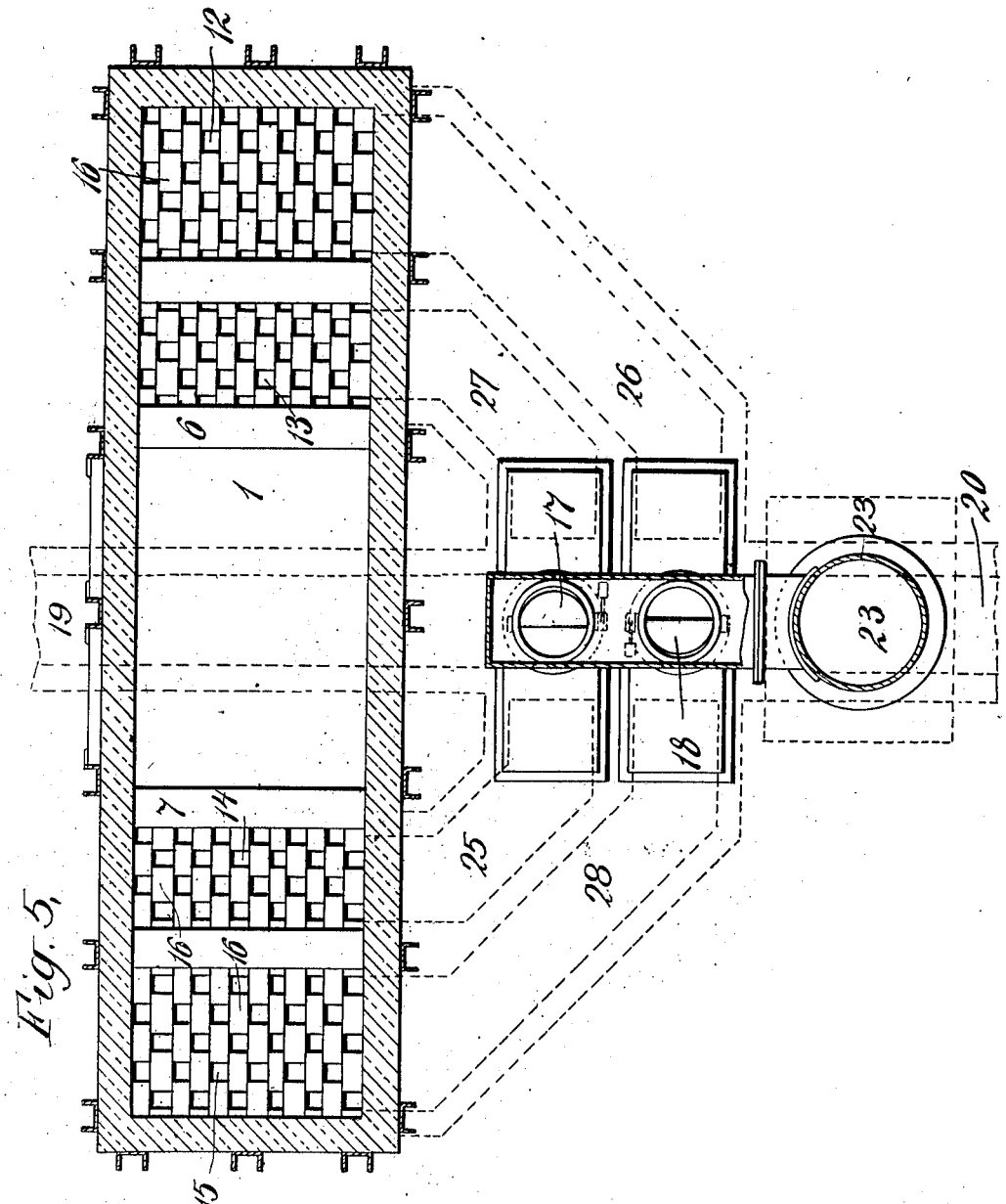

B. E. ELDRED.
METALLURGICAL HEATING PROCESS.
APPLICATION FILED MAY 28, 1907.

1,035,331.

Patented Aug. 13, 1912.
4 SHEETS—SHEET 4.

WITNESSES:

INVENTOR
Byron E. Eldred
BY
Marble & McElroy
ATTORNEYS

UNITED STATES PATENT OFFICE.

BYRON E. ELDRED, OF BRONXVILLE, NEW YORK, ASSIGNOR TO THE COMMERCIAL-RESEARCH COMPANY, OF NEW YORK, N. Y., A CORPORATION OF NEW YORK.

METALLURGICAL HEATING PROCESS.

1,035,331. Specification of Letters Patent. Patented Aug. 13, 1912.

Application filed May 28, 1907. Serial No. 376,097.

*To all whom it may concern:*

Be it known that I, BYRON E. ELDRED, a citizen of the United States, residing at Bronxville, in the county of Westchester and State of New York, have invented a certain new and useful Metallurgical Heating Processes; and I do hereby declare the following to be a full, clear, and exact description of the same, such as will enable others skilled in the art to which it appertains to make and use the same.

This invention relates to metallurgical heating processes, and consists in a method of heating metals and other sensitive materials to high temperatures by means of streaming atmospheres of indifferent producer gas, charged with sensible heat; all as more fully hereinafter set forth and as claimed.

In most methods now in use for imparting high temperatures at and above a red heat, heating is done by causing combustion to take place in and around the materials to be heated or by causing intensely hot products of combustion to contact with such materials. As combustion in practice cannot be efficiently carried out without an excess of oxygen, frequently approaching 20 per cent. of excess air, it is difficult to heat to very high temperatures in this manner without oxidation of such metals as copper and iron. When flames are run reducing, there are usually oxidizing strata in them which are likely to cause injury if they happen to contact with such metals, and such reducing flames are apt to deposit carbon in the form of soot. Neither can a reducing flame be run at very high temperatures, an excess of oxygen being necessary for quick combustion and high temperature. Further, in either type of flame carbon dioxid is necessarily present and this has an oxidizing effect on iron.

In the present method, heating is done by highly heated circulating atmospheres of an indifferent gas neither tending to oxidize metals nor to deposit carbon upon them, the necessary amount of heat being imparted to the gas in the form of sensible heat prior to its contact with the objects to be heated. Using producer gas as the carrier, it may be very advantageously heated to the necessary high temperature by combustion of the gas after it has contacted with the materials to be heated. With such producer gas, briefly, combustion is effected subsequent to its contact with the materials to be heated instead of prior thereto, and the heat of combustion is imparted to fresh gas to be contacted with the said materials. For this purpose hot producer gas taken directly from the producer is very advantageous. Its high temperature enables it to be stepped up to intense temperatures in going through regenerators heated by combustion of such intensely hot gas, while its substantial freedom both from such oxidizing gases as carbon dioxid and oxygen and from such carbon-depositing gases as the hydrocarbons found in ordinary fuel gas, enables it to be contacted with hot metals without fear. It contains carbon substantially only in the form of CO which has no tendency to give up carbon or "soot" or to impart oxygen to oxidizable bodies.

While the stated operation may be effected by direct combustion of the gas issuing from the heating furnace around the conduit carrying gas into the said furnace, it is generally better, and particularly in the case of the high temperatures, at and above a red heat, herein contemplated more particularly, to use some form of regenerative device, as it is difficult to find materials sufficiently conductive of heat and resistant thereto to permit use of compact relatively moderate sized structures. However, conduits of tile and the like may be employed.

This invention is particularly useful in furnaces for heating thin sheet metal, for heating piled metal and for like purposes where oxidation is very undesirable, and further for heating steels and other metals of exact composition which composition it is desired to maintain unchanged. Taking a steel with a certain content of carbon or of such oxidizable alloying constituents as nickel, cobalt, vanadium, tungsten, molybdenum, aluminum and the like, in practice it is difficult to heat it to working temperatures without some change ensuing in the composition.

In the accompanying illustration is shown one type of apparatus of the many adapted to perform my process. In this illustration, Figure 1 shows a vertical longitudinal section of the furnace and regenerators; Fig. 2 shows a transverse vertical section through the gas valve and housing; Fig. 3 shows a similar section through the air valve and housing; Fig. 4 shows a transverse section of the furnace, valve housing and air and gas conduits; Fig. 5 shows a horizontal section of the apparatus, the section being taken through the furnace and offtake flue; Fig. 6 is a diagrammatic view partly in elevation and partly in section, showing the complete apparatus, the furnace and valves being shown on different levels in order that each may be seen in elevation.

Like reference characters designate like parts in all views.

In the drawings, 1 designates a heating chamber having doors 2 and a floor 3 sloping upwardly to the doors (see Fig. 4). Above it is provided with a roof 4 of the usual refractory materials shaped in the form of a double reverberatory, having a reversed arch 5. At the sides of the chamber 1 and separated therefrom by walls 6 and 7 are a pair of structures generally like regenerators; and above these regenerators are combustion chambers 8 and 9 communicating with chamber 1 over the tops of walls 6 and 7. Each regenerator is divided by walls 10 and 11, into twin chambers, respectively 12 and 13 and 14 and 15. These chambers are all provided with the usual checkerwork or other suitable structure, 16, of refractory materials. Butterfly valves 17 and 18 control the course of the gases through the checkerwork chambers. Gas enters through a duct 19, and air through a duct 20. The valve chambers, 21 and 22, in which valves 17 and 18 are located, communicate with an offtake 23; such communication being controlled, as regards chamber 22, by a saucer valve 24, which is normally closed, except when heating up the chamber 1, as hereinafter described. Valves 17 and 18 are normally set in opposite positions, as shown in Fig. 6; that is to say, in the language of the art, the valves are "crossed" normally. Supposing the furnace to be in full operation, and the valves to be in the positions shown in the drawings, gas enters at 19; and is deflected by valve 17 into passage 25, leading to checker chamber 14; and air enters at 20, and is deflected by valve 18 into passage 26, leading to checker chamber 12. Chamber 14 is hot, having been heated previously by down flow of hot gases through it, and the gas from passage 25 becomes highly heated in passing through it, and then passes through furnace chamber 1 to chamber 8 where it encounters the air passing through passage 26 and chamber 12 and begins to burn, the flame and heated products of combustion passing down through checker chamber 13 and through passage 27 to valve 17 and thence to offtake 23. Combustion of the gas therefore takes place, after the gas has passed through the furnace chamber 1, and while it is in or passing through chamber 13; the checker work in chamber 13 being thereby highly heated and the products of combustion in turn cooled. After a time, when the checker work in chamber 14 has been cooled below the point of efficient heating, and that in chamber 13 has been highly heated, the positions of valves 17 and 18 are reversed, gas now passing through passage 27 and chamber 13, being heated therein, thence passing through chamber 1 to chamber 9 and there encountering air which has passed through passage 28 and chamber 15; combustion taking place in chambers 9 and 14, the gases passing down through chamber 14 and heating the checker work therein, and then passing through passage 25 to offtake 23.

When the furnace is operating in the manner described, heating in chamber 1 is performed entirely by the sensible heat of the intensely hot but unburnt gas, which gas is practically free of air and hence constitutes a non-oxidizing atmosphere. Preferably, the gas enters duct 19 direct from a producer, and at the high temperature at which it is discharged from such producer; and having such high temperature initially, and being stepped up to a much higher temperature plane by the heat imparted to it in the checkerwork chamber 13 or 14, as the case may be, its temperature is quite high enough to enable it to perform efficient heating of metals in chamber 1 without any combustion in said chamber whatever, and with all the advantages of an absolutely smokeless non-oxidizing atmosphere. The advantages of heating in such an atmosphere will be obvious. Not only will oxidation or other contamination of the material heated be avoided, but the heating will be very thorough and uniform, in all parts of chamber 1. It will be noted that while in ordinary furnaces in which combustion takes place before the gas enters the heating chamber or while in said chamber, the temperature at the outlet end of said chamber is usually considerably less than that at or near the inlet end, the temperature at the outlet end of chamber 1 will be substantially that at the inlet end or even slightly higher, owing to radiation and conduction of heat from the checker chamber in which combustion is taking place. It will be obvious, however, that there may be partial combustion of gas under certain conditions in chamber 1 without impairing the protection against oxidation of the material on the hearth 3, and that thereby the heating efficiency in chamber 1 may be raised still higher, by radiation of heat toward the hearth. To this end, it is necessary merely to admit above the stratum of gas a stratum of air. Combustion will then take place along the area of contact of the two strata while passing through chamber 1, while below the flame stratum will be a stratum of gas unmixed with air and therefore not burning but allowing the radiant heat from the combustion above to pass downward therethrough to the materials to be heated beneath. One convenient manner of obtaining this condition is to place valve 18 in an intermediate position, so that air will be admitted through both checker chambers 12 and 15. From the position of the regenerator chambers, it follows that the air will be admitted above the gas stratum and will produce a burning layer next the roof, radiating down heat through the unburning gas below. Under the described conditions, the air so admitted is burning in the presence of an excess of combustible gas, i. e., the conditions are the reverse of those usually prevailing where combustible gas is burnt in the presence of an excess of air. This permits an intense hot combustion near the refractory roof, whence heat will be radiated downward, without danger of oxidation of the material under treatment, or, producer gas being non-sooting, of deposition of carbon thereon.

In so far as yet described, checker chambers 12 and 15 have had no function other than to serve as flues, nor has saucer valve 24. These chambers and the saucer valve are employed when heating up the chamber 1 quickly, and when, therefore, combustion in this chamber is desired. At such times, valves 17 and 18 are set in corresponding positions, instead of being "crossed" as before, and valve 24 is raised. Supposing that valve 17 is in the position shown in Fig. 6, valve 18 will then be in the position opposite that shown in said figure, and gas and air will enter through passages 25 and 28 respectively, will pass through checker chambers 14 and 15, respectively, becoming highly heated in so doing, and will then mingle, combustion will begin, and the burning gases will flow through chamber 1, being deflected downward toward the floor of the chamber by the reversed arch 5 thereof, and will then pass out through chambers 12 and 13, passages 27 and 26, and chambers 21 and 22, (Fig. 4) to stack 23. Periodically the valves 17 and 18 will be reversed to send the entering gas and air through the highly heated checker chambers and to send the products of combustion through the partly cooled chambers. Under these conditions chamber 1 will be heated up very rapidly indeed, as will the checker chambers. This heating chamber is charged with a store of sensible heat and the duty imposed upon the superheated combustible gas thereafter introduced as regards carrying in sensible heat is lessened to that extent. Practically the superheated gas has merely to carry in the units lost by radiation and those absorbed by the iron being heated. It will be seen, therefore, that by the arrangement of butterfly valves 17 and 18 and saucer valve 24, shown, I have produced a very simple and easily operated valve structure, convertible at will from a three-way valve to a four-way valve, and by its operation capable of changing the heating conditions in the furnace instantly from non-oxidizing heating without combustion, to heating with combustion either oxidizing or reducing.

The furnace, when working normally with combustion of the gas after passing through chamber 1, will customarily be worked under slight plus pressure, so that there may be no infiltration of air into the hot but unburnt gas. The effect of the progressive expansion of the gas as it becomes heated in passing through the checker work is to produce the desired plus pressure.

Under certain conditions I find it convenient and useful to introduce air for roof combustion through nostrils in or close to the reverberatory arch 14 of chamber 1. For this purpose I have shown in Figs. 1 and 6, nostrils 29 supplied with air by a pipe 30, and provided with valves 31 whereby the flow of such air may be regulated or stopped. By means of these nostrils a small portion or thin current of overlying air can be introduced above the gas in its passage through the heating chamber 1. This thin current of air will burn in and with the uppermost layer or producer gas in the surface of the arch and upper wall of the furnace chamber, affording a useful source of radiant heat which will penetrate downward through the body of heated gas to the metal articles to be heated. Combustion is particularly active in and upon the surface irregularities of refractory materials and a thin stream of air led along the surface of the arch will produce a heating effect out of proportion to its sheer amount. The nostrils may also be used to supply a further portion of air to the gas just prior to its entry into the checkerwork.

What I claim is:—

1. In the heating of metal objects, the process which comprises covering said objects in a reverberatory roofed furnace chamber with a flowing stream of hot reducing gas in an unburning state and producing near such roof and in radiant relation to such objects a flame of air burning in the presence of an excess of such gas.

2. In the heating of metal objects, the process which comprises surrounding such objects in a furnace chamber with a flowing stream of hot non-oxidizing unburning combustible gas and injecting air into such current of gas at a distance from the objects to be heated but in radiant relation thereto and thereby producing in such gas current one or more flames of air burning in an excess of such gas.

3. In the operation of furnaces provided with a furnace chamber and a pair of companion regenerative devices at each end, the process of heating which comprises heating up the furnace chamber by combustion of air and gas therein, said gas and air being respectively introduced through the companion devices at one end and the products of combustion removed through the companion devices at the other end, alternating such operation until the chamber is stored with sensible heat and then alternately passing combustible gas through the chamber from one of each such pair while transmitting air for combustion through one of the devices at the other end of the chamber and removing products of combustion through the companion device at said other end, the companion device to the one wherethrough combustible gas is passed being out of operation during such passage.

In testimony whereof I affix my signature, in the presence of two witnesses.

BYRON E. ELDRED.

Witnesses:
 LEO. J. MATTY,
 H. M. MARBLE.